Jan. 15, 1963  LE ROY K. FLEMING  3,073,032
INSTRUMENT FOR DETERMINING SIDEREAL AND SOLAR TIME
Original Filed Dec. 9, 1957  2 Sheets-Sheet 1

INVENTOR
Le Roy K. Fleming

BY Allan J. Murray
ATTORNEY

Jan. 15, 1963    LE ROY K. FLEMING    3,073,032
INSTRUMENT FOR DETERMINING SIDEREAL AND SOLAR TIME
Original Filed Dec. 9, 1957    2 Sheets-Sheet 2
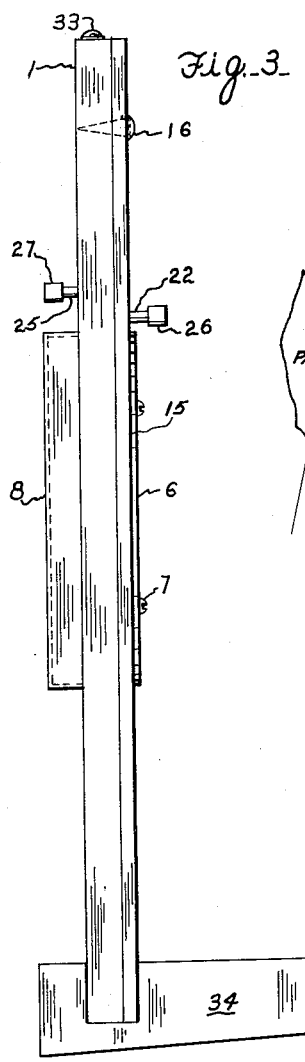
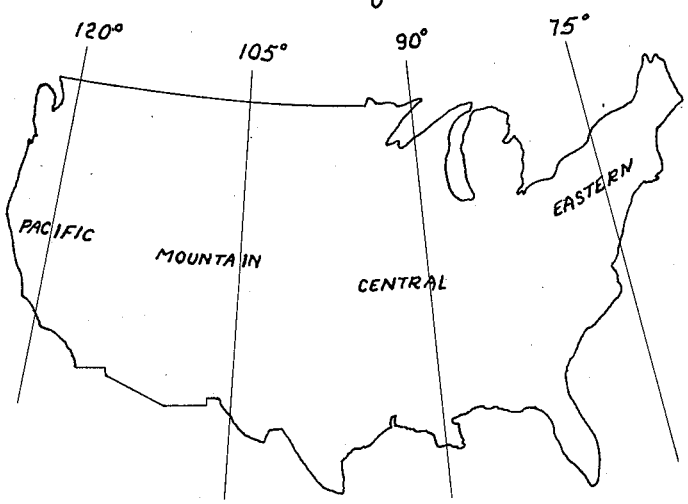
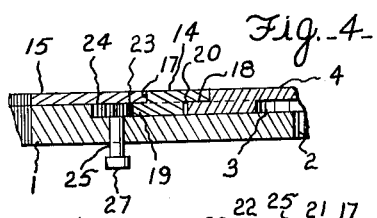
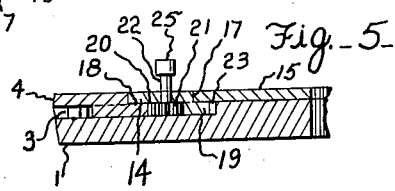
INVENTOR
Le Roy K. Fleming
BY Allan J. Murray
ATTORNEY

United States Patent Office 3,073,032
Patented Jan. 15, 1963

3,073,032
INSTRUMENT FOR DETERMINING SIDEREAL AND SOLAR TIME
Le Roy K. Fleming, 14196 E. 7 Mile Road, Detroit 5, Mich.
Continuation of application Ser. No. 701,456, Dec. 9, 1957. This application May 15, 1961, Ser. No. 120,827
6 Claims. (Cl. 33—64)

This invention relates to devices for determining time from observation of the stars, and particularly to such devices as are designed to accurately determine sidereal time by such observations, and translate the results into terms of solar time.

This is a continuation of my application Serial No. 701,456, filed December 9, 1957.

An object of the invention is to provide a holder with relatively adjustable members bearing graduations representing longitude, calendar dates, and solar time, whereby said members may be relatively adjusted in accordance with observation of the stars to indicate any one of the factors represented by said graduations if the other two factors are known.

A further object is to include on one such member, graduations respectively representing sidereal time and solar time, whereby sidereal time may be determined without observation of the stars, if the other three factors are known.

A further object is to provide for relative rotative adjustment of said members about a common axis, and to dispose said graduations in concentric relation to said axis to afford rotatively selective correlations of said graduations for determination of a desired factor.

A further object is to provide an elongated sighting edge substantially on a diameter of a member, whereby alignment of said edge with a pair of stars by rotative adjustment of such member effects a proper correlation of said graduations to determine the desired factor.

A further object is to illuminate said sighting edge to provide a visible means for alignment with a plurality of stars.

A further object is to provide geared means for establishing accurate selective rotative adjustments of said rotatable members.

These and various other objects are attained by the construction hereinafter described and illustrated in the accompanying drawings, wherein:

FIGURE 3 is an elevational side view on the line 3—3 of FIGURE 1;

FIGURE 4 is a fragmentary view in section on line 4—4 of FIGURE 1;

FIGURE 5 is a fragmentary view in section on the line 5—5 of FIGURE 1; and

FIGURE 6 is an outline map of the United States depicting the four established time zones and four standard meridians extending through such zones.

Construction

Figure 2:
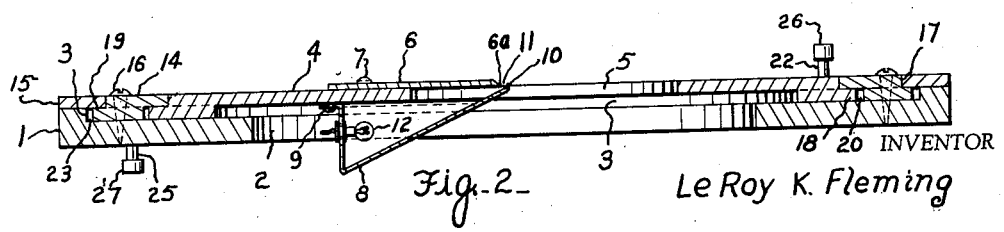
FIGURE 2 is a horizontal cross section on line 2—2 of FIGURE 1.

In these views, the reference character 1 designates a rectangular back plate of a holder, such plate being formed centrally with a circular opening 2. Marginally of such opening said plate has in its front face an annular recess 3 concentrically and rotatably receiving a disc 4. Said disc is centrally formed with an opening 5. A semi-circular plate 6 partially covers such opening and is fixed to the front face of the disc by screws 7. Such plate has a straight, star-sighting edge 6a, disposed substantially on a predetermined diameter of the disc. An enclosure 8 is secured by screws 9 to the rear face of the disc and is formed with a thin lip 10 occupying a parallel relation to said sighting edge, and slightly spaced therefrom to form a narrow slit 11. As is clearly seen in FIGURE 2, said enclosure forms an angle with said disc, and in such angle is disposed a small light bulb 12, receiving power from flashlight batteries (not shown) to illuminate the aforesaid slit. It is preferred to cover such slit with transparent colored material, as of plastic, to subdue said illumination, thus providing a visible line of light for alignment with a plurality of stars. Such arrangement provides an obvious advantage over aligning an unilluminated edge with the stars, this being particularly so on dark nights.

Further received in the marginal recess 3 of said back plate 1, and rotatably encircling the disc is a ring 14. A rectangular front plate 15 is rigidly secured as by screws 16 to the front face of said back plate, and is apertured at 17 to fit closely about said ring and overlie a flange 19 thereof, thus retaining the ring rotatively in position. The ring 14 itself similarly overlies an annular flange 18 formed on the circumferential marginal portion of the disc 4, to retain the latter in said recess 3.

The entire periphery of the aforesaid flange 18 of the disc is formed with gear teeth 20 (partially illustrated) which are engaged by a pinion 21, having a stem 22 projecting through the ring. The flange 19 of the ring bears similar teeth 23 (partially illustrated) to be engaged by a pinion 24, the stem 25 of which projects through the back plate 1. Each stem 22, 25 outwardly terminates in a knob 26 and 27 respectively. Such knobs may be knurled or serrated to facilitate manually applied rotation of said pinions. It is apparent that such arrangement affords accurate, selective rotative adjustment of the ring and plate relative to each other and to the front plate.

Indicia

It is intended that the partially illustrated graduations 28 appearing on the front plate 15 marginally of the aperture 17 represent degrees of longitude. The degree enumeration is omitted and a line V—V vertically disposed on said front plate may hence designate any desired degree of longitude.

The graduations 29 on the front face of the ring represent the units of a year. The graduations 30 and 31 concentrically disposed on the disc represent the units respectively of a sidereal and a solar day. All of the aforesaid graduations are angular to and centered at the common axis of rotation of said disc 4 and ring 14. The aforesaid illuminated slit 11 occupies a position substantially on the diameter of said disc 4 to bisect the solar time graduations to be read as ante-meridian and post-meridian hours. It will be noted that the sidereal time scale 30 and solar time scale 31 have their hour marks offset from each other, for example, when solar time is twelve a.m., sidereal time is 14 hours, 49 minutes. The amount of offset is selected arbitrarily, however, some offset is always necessary because the sidereal day is shorter than the solar day. The particular amount of offset selected will determine the position of the S–M mark on the ring 14. The mark S–M is the time of the day of the year when a solar time scale mark is aligned with a sidereal time scale mark which is the correct sidereal time for the particular date and solar time. For example if the solar time line for midnight were aligned with the zero hour sidereal time line, then the S–M mark should be placed at a point slightly in advance of September 20, 1960.

Determining Time

Where the longitude and date are known, solar and sidereal time may be determined by positioning the instrument to dispose the line V—V substantially in a plane vertical to the horizon (the meridian plane). A conventional level indicator 33 assists in establishing said position. The function of the longitude marks 28 is to correct the setting of the instrument in accordance with the exact longitude of the point of observation. This is necessary because "watch" time is not the correct solar time if the position of the observer is not exactly on the standard meridian (represented by the line V—V) of the time zone in which he is located. The observer may be located either east or west of his standard meridian. For example, if he is located in the central time zone at longitude 93°, he is 3° west of the central time zone standard meridian which is longitude 90°. He should thus position the S–M mark of the ring 14 3° west (clockwise) of the line V—V. In the procedures which follow, the longitude settings or readings are in accordance with the above-described conditions. Sighting against the edge 6a of the disc 4, the user rotates such disc until both of the pair of stars being used appear by optical illusion to be aligned in the illuminated slit 11. Theoretically, many pairs of stars could be used for the sighting step. The function of the pair of stars is to provide a hypothetical line which revolves about the North celestial pole. This line may be considered to be equivalent to a clock hand. As a practical matter, the selection of a pair of stars such as Kochab and Polaris is preferred for two reasons. The maximum apparent spread between these two stars is less than the diameter of the sighting line 6a of the disc 4. Thus both stars will always be aligned within the device. In addition, due to the proximity of Kochab and Polaris to the celestial North pole, the apparent distance traveled by the stars during the night is relatively small and thus provides for easy location of the stars by the observer. The correct solar time will then be found registered with the correct date, and the correct sidereal time will be registered with the line V—V. In the embodiment illustrated in FIGURE 1, a permanent index is not provided to indicate the line V—V to enable reading of the sidereal time. The sidereal time may be read by extending a guide line, such as a string, between the two V's. If date, longitude, and solar time are known, sidereal time may be determined without reference to the stars, by registering the solar time with the date graduations, whereon the sidereal time will be registered with the line V—V.

Determining Date

Knowing solar time and longitude, one follows the sighting procedure described above. The graduations representing the known solar time will be registered with the graduation indicating the correct date.

Determining Longitude

Given the correct date and solar time, determination of longitude is based on the fact that four minutes of solar time correspond exactly to one degree of longitude. The stars are sighted as above mentioned, and the difference between the solar time indicated on the instrument and the actual solar time (known) is divided by four. The result is the number of degrees of longitude east or west of the longitude for which the instrument is set.

Reconciliation of Time Circle Graduations

The rotation of the earth on its axis creates the illusion of a counter-clockwise rotation of the stars about the North celestial pole once in each sidereal day. However, because the earth's direction of orbital travel is in reverse direction to its rotation on its axis, the joint effect of the two motions is to induce one and a fraction ($1/365$) rotations relative to the sun to effect a solar day of twenty-four hours. The extra fractional rotation makes the solar day about 3 minutes and 56 seconds longer than the sidereal day. While, of course, the precise time difference may readily be applied to this invention, in the following explanations such difference will for convenience be equated with 4 minutes—the exact amount of time represented in a solar day by one degree of the earth's rotation.

If the hours on the sidereal and solar time graduations were each represented by 15 degrees, the time difference, accruing during the day, would cause the solar time to be indicated as one minute slow after six hours, 2 minutes slow after twelve hours, etc. This, because an angular rotational advance of the stars of, for example 180°, would be represented by 180° on the sidereal graduations as equivalent of 12 sidereal hours; but on the solar graduations 180° would be equivalent to only 11 hours and 58 minutes in solar time or a period of equivalent to 12 sidereal hours.

In order that a sighting of stars result in registration of the correct solar time graduation with the correct date graduation, compensation must be made for the aforesaid discrepancy in sidereal and solar time. This compensation is effected in the circle of solar time graduations 31. The angular graduations representing twenty-three hours are so spaced that each hour includes the angular spacing equivalent to the difference between a sidereal and a solar hour. As each hour would normally include a spacing of 15 degrees, the tweny-fourth "hour" will naturally be represented by an angle of less than 15 degrees (three minutes, 56 seconds or approximately one degree).

The result, however, is that an angle of rotative advance of the stars, such as the foregoing example of 180°, is represented on the circle of solar time graduations by 180° plus the total additional angular spacing added to each hour, such additional spacing being equivalent to two minutes, the solar time will be registered correctly as twelve solar hours.

Obviously, the twenty-fourth "hour" of the solar time graduations cannot register accurate time, hence, it is preferred that such hour be the one immediately preceding 12 a.m., as the invention cannot be used at such time. Consequently, for purposes of this invention each day begins at 12:00 a.m., the graduations 30, 31 being so relatively disposed as to be properly correlated from 12:00 a.m., to 11:00 a.m., of each day.

The above assumes only one revolution of the earth. But as a solar day includes an additional $1/365$ of a revolution, it is considered in reckoning solar time from the stars that each successive day begins with the stars in a position advanced by $1/365$ of a revolution from their position at the beginning of the preceding day. While a given position of the stars will indicate 0 hour on the sidereal time circle 30 every day, the solar time is read on each successive day as it registers with the progressive date graduation 31 on the calendar ring 14. This, of course, means a daily advance of $1/365$, corresponding to the aforesaid daily advanced position of the stars.

Establishing Angular Relation of Time Circles

Figure 1:
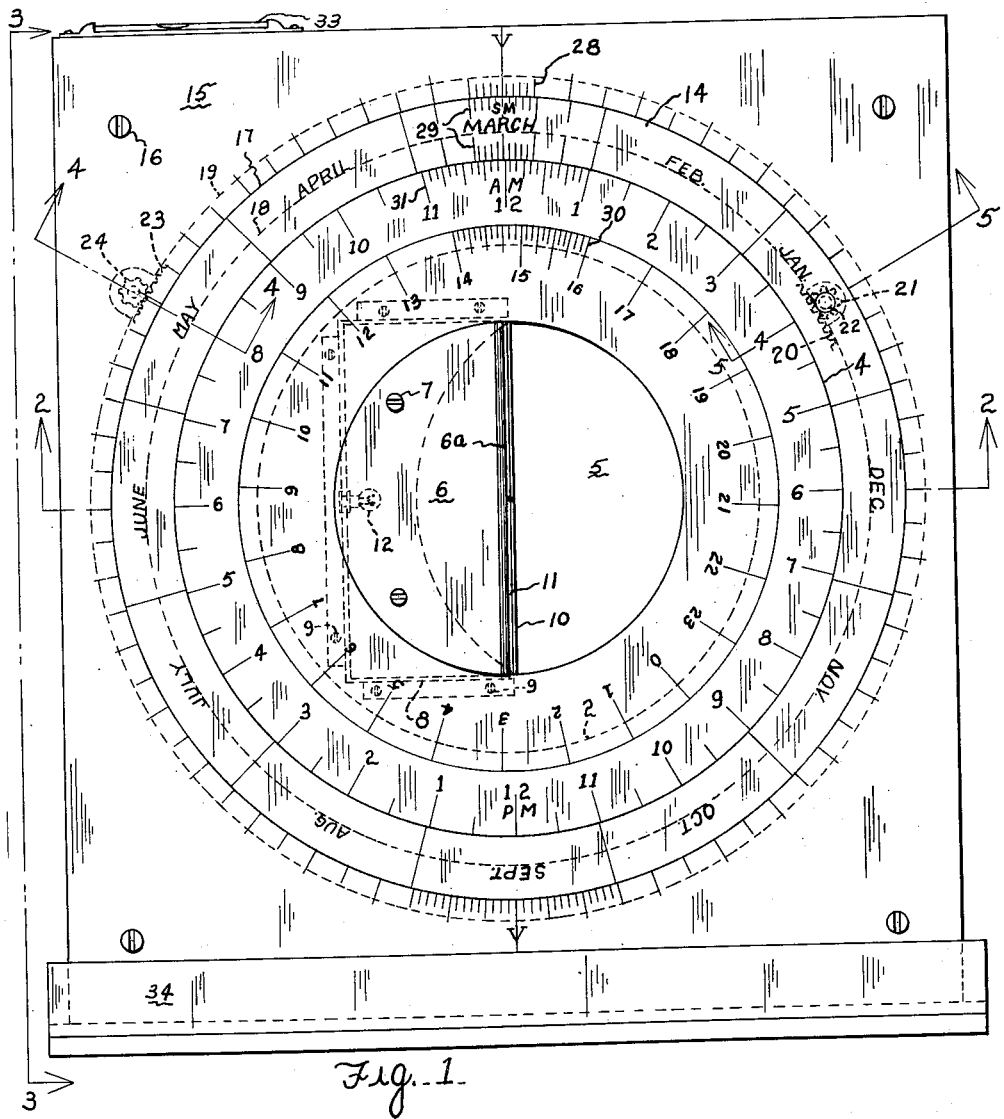
FIGURE 1 is an elevational front view of the invention.

In the embodiment illustrated in FIGURE 1, the S–M mark was chosen so the sighting edge would be vertically disposed at noon and midnight. After the solar time graduations 31 were applied as described above, the disc was rotated to align the sighting edge with the vertical line V—V, with 12:00 a.m., uppermost. It was then ascertained at what time on a given day the stars employed were aligned in a plane vertical to the horizon and coinciding with the meridian at the point of observation. The calendar ring was then rotated to register the correct date graduation 29 with such solar time graduation 31, and a mark S–M applied to the date graduation which registered with the line V—V.

The sidereal hour indicated on that date by said position of the stars was then determined and a graduation was marked on the disc to register with the line V—V. Such graduation serves as a starting point for application of the remaining graduations 30.

Polaris and Kochab are used as primary sighting stars in the embodiment of the invention. A hypothetical line between such stars will never register with the hypothetical vertical plane of a meridian, and hence the sidereal time indicated by such stars when they do align in a plane vertical to the horizon must be determined by calculation. The above data is acquired preparatory to and applied during production of the instrument.

Due to the establishment of time zones, the time indicated by the position of the stars at any standard meridian will be indicated by the same position of such stars at any other standard meridian. The device being set for one such standard meridian as above stated will function correctly on any of the others.

If desired for use any known number of degrees of longitude west of a standard meridian, the calendar ring is rotated until the mark S–M registers with the longitudinal marking 28 representing such number of degrees counted from the line V—V. Such rotation is made counter-clockwise for use east of a standard meridian.

As solar time and longitude are each a factor in determining the other, it is desirable to reduce the margin of error possible from the expanded hour angle of the solar time graduations 31. Hence in the circle of graduations 28 representing longitude ten such graduations are spaced at the bottom of such circle to include 4½ degrees on each side of the line V—V, and 350 graduations are equally, angularly distributed through the remaining 351 degrees.

It is well known that a year is actually three-hundred and sixty-five, and approximately one-quarter days long. Such extra quarter day accounts, of course, for the inclusion of February 29th every fourth year. This means an additional annual rotational advance of the stars amounting to one minute in time. As February 29th is omitted from the construction herein discussed, such construction, if set for use during a leap year, would read time one minute slow for each subsequent year until the following leap year. This may be averted by rotating the calendar ring clockwise one-quarter of a degree for each of said following years (at first of each year), and rotating such ring counter-clockwise each February 29th, the total of said clockwise rotation.

By employment of precise mathematical calculations in determining the application of the various circles of graduations, the invention is capable of a high degree of accuracy. It further improves over prior devices in affording a direct reading of solar time from a sidereal sighting, this having been determined in previous practice by mathematical computation based on sidereal time.

It will, of course, be realized that the discussed invention is not limited to use with any one pair of stars but may be set up for use with any plurality of stars which simultaneously register in a hypothetical plane vertical to the horizon. This is true also of stars rotating about the South celestial pole, with proper consideration to the fact that the apparent rotation of such stars is counter to that of the stars discussed above.

Having thus described my invention, I claim:

1. An instrument for determining sidereal and solar time from observation of stars, said instrument comprising a holder having a front and a back face, and bearing on its front face graduations representing degrees of longitude, a disc rotatably carried by said holder and bearing angular graduations representing time units of a day, a ring rotatably encircling said disc and bearing angular graduations representing units of year, said disc and ring being rotatable about a common axis, said graduations being concentric about and centered at said axis, means for rotatably actuating said ring, means for rotatively actuating said disc independently of said ring to establish selective correlations of said graduations, and star-sighting means carried by said disc to determine such correlations, whereby longitude may be ascertained, given date and solar time; solar time may be ascertained, given date and longitude; and the date may be ascertained, given longitude and solar time.

2. An instrument as set forth in claim 1 and further characterized in that said angular graduations on the disc are disposed in concentric circles in an arbitrary relationship with respect to each other to represent, respectively, the time units of a solar day and the time units of a sidereal day; the angular relationship between the solar day time units and the sidereal day time units being indicated by indicia on the year ring whereby sidereal time may be ascertained given solar time, date and longitude; said angular relationship being indicated by the indicia on said ring to indicate the date upon which a pair of oppositely disposed time unit graduations on the disc correspond to the correct solar and sidereal times.

3. An instrument for determining sidereal and solar time, from observation of stars, said instrument comprising a holder having a front and back face, and bearing on its front face angular graduations representing degrees of longitude, a disc rotatably carried by said holder and bearing angular graduations representing time units of a day, a ring rotatably encircling said disc and bearing angular graduations representing units of a year, said disc and ring being rotatable about a common axis to establish various selective correlations of said graduations, gear teeth formed on the periphery of the ring, a pinion having a driving engagement with said gear teeth; gear teeth formed on the periphery of said disc, a pinion having driving engagement with said latter gear teeth, means for manually applying rotation to said pinions to effect said correlations, and star-sighting means carried by said disc to determine said correlations, whereby time may be ascertained, said graduations being concentric about and centered at said common axis.

4. An instrument as set forth in claim 3, said disc and said holder having communicating apertures, said star-sighting means including a sighting edge for alignment with a plurality of stars, such edge being substantially upon a predetermined diameter of said disc and partially obstructing said apertures.

5. An instrument as set forth in claim 3, said disc having an aperture, said holder having an aperture communicating with said first mentioned aperture, said star-sighting means including elements jointly forming a slit, means to illuminate said slit, said elements partially obstructing said apertures, and said slit being positioned substantially on a predetermined diameter of said disc, whereby rotation of the disc effects proper sighting when said slit is aligned with a plurality of stars.

6. An instrument for astronomy comprising a holder having a front face and a back face; said holder bearing on its front face angular graduations representing degrees of longitude; a ring rotatably mounted on the front face of the holder within said holder and bearing angular graduations representing units of a year; a disc rotatably mounted on the front face of the holder within the ring and bearing angular graduations representing time units of a solar day and time units of a sidereal day; the angular graduations on the disc being disposed in a pair of concentric circles in an arbitrary relationship with respect to each other; said disc and ring being independently rotatable about a common axis to establish selective correlations of said graduations; all of said graduations being concentric about and centered at said axis; indicia on said ring to indicate the date of an arbitrarily selected year upon which a pair of oppositely disposed time unit graduations on the disc correspond to the correct solar and sidereal times; said indicia being effective to indicate the angular relationship between the solar day time units and the sidereal day time units whereby given any three of the factors of sidereal time, solar time, date and longitude, the fourth factor may be ascertained.

No references cited.